Jan. 5, 1971     L. H. SWIFT     3,552,107
FRUIT PICKER HEAD
Filed Aug. 5, 1968     3 Sheets-Sheet 2
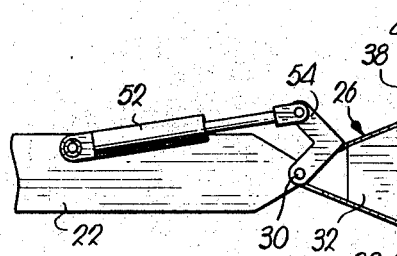
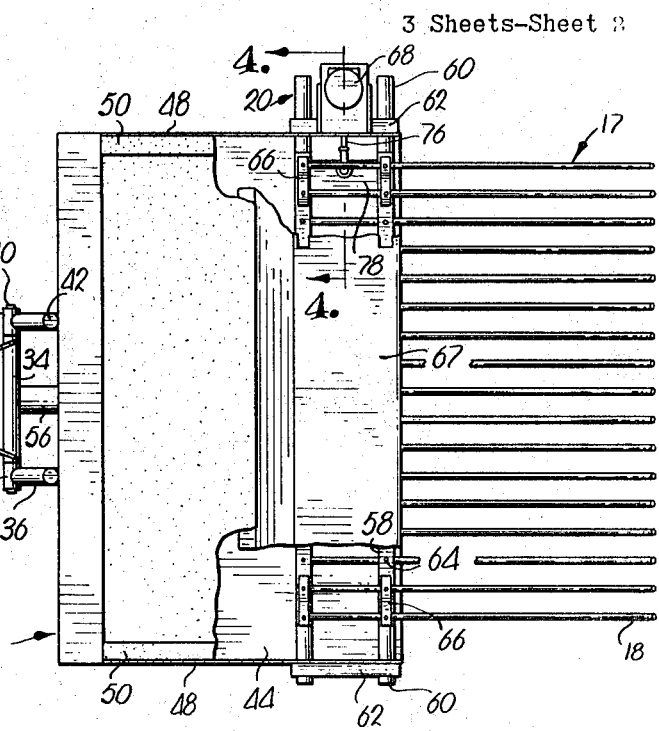
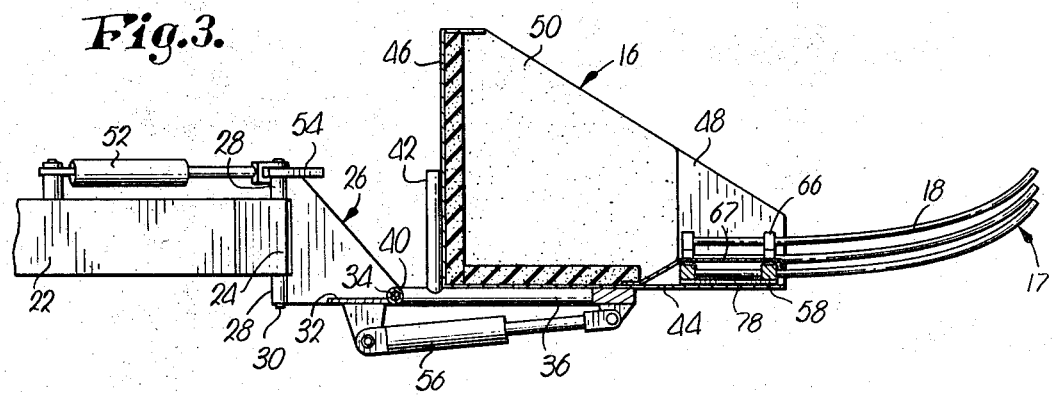
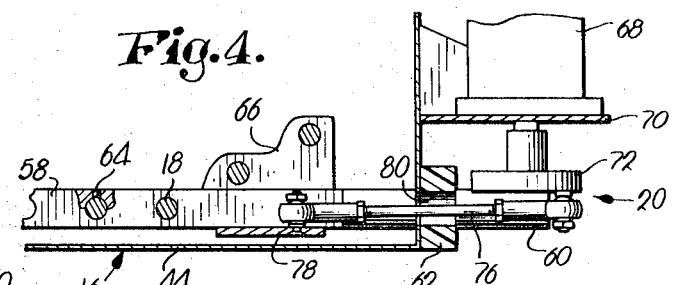
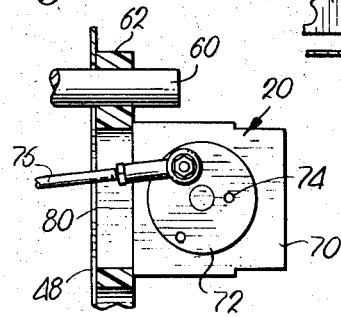
INVENTOR
Lloyd H. Swift
BY *Hovey, Schmidt, Johnson & Hovey.*
ATTORNEYS.

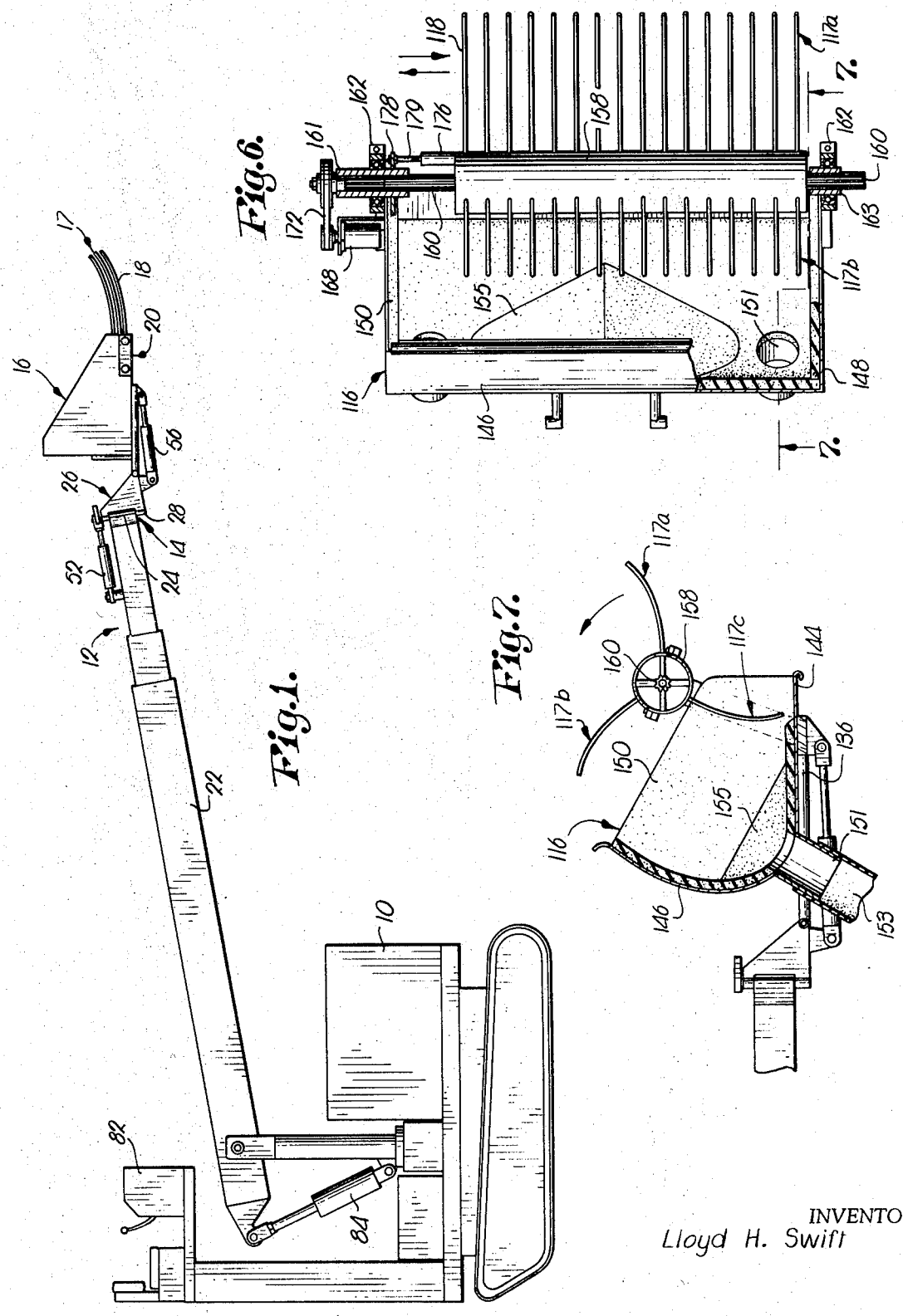

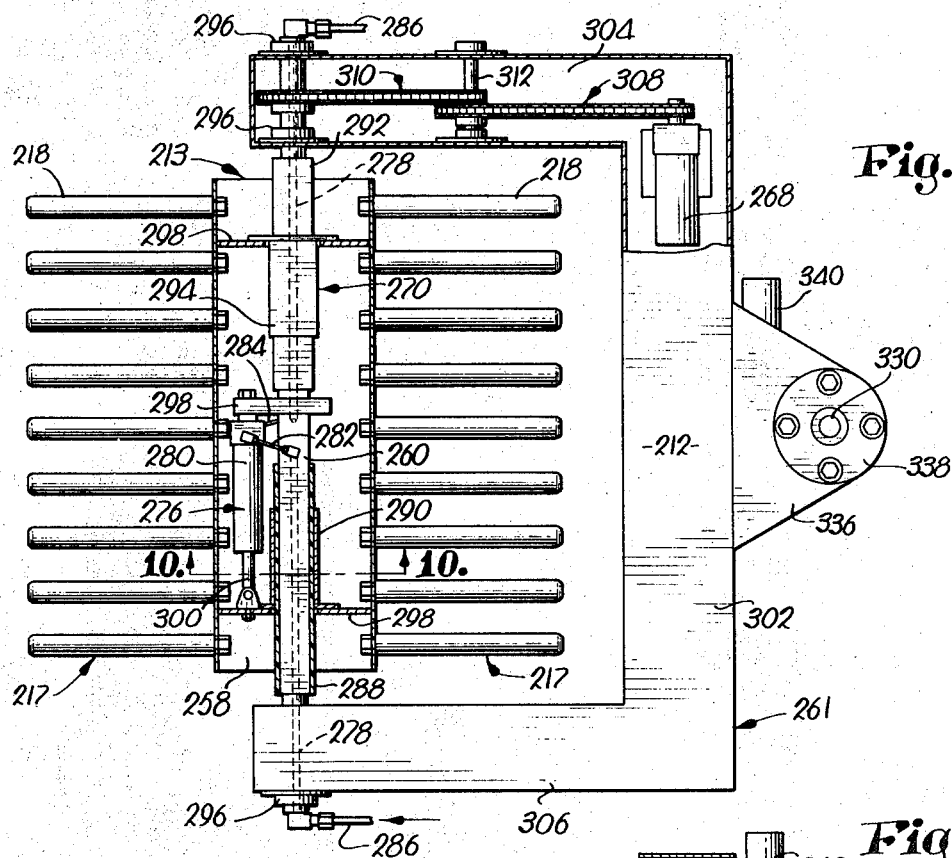
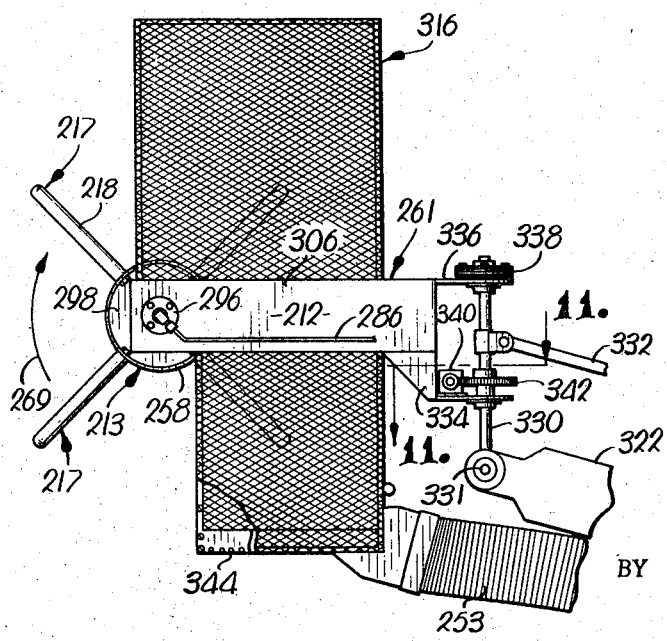

United States Patent Office 3,552,107
Patented Jan. 5, 1971

3,552,107
FRUIT PICKER HEAD
Lloyd H. Swift, 1004 N. Jefferson,
Carrollton, Mo. 64633
Continuation-in-part of application Ser. No. 559,578,
June 22, 1966. This application Aug. 5, 1968, Ser.
No. 750,281
Int. Cl. A01g 19/08
U.S. Cl. 56—328                                        6 Claims

ABSTRACT OF THE DISCLOSURE

A machine for picking fruit has a boom-supported head provided with fingers for dislodging the fruit and collecting it within a container that moves with the head during manipulation of the boom as well as during movement of the head relative to the boom. Dislodgment is effected also by continuous oscillatory movement imparted to the fingers as they are raised, lowered, tilted and otherwise moved into and out of the tree among its branches. In an advantageous embodiment of the invention the fingers are also rotated constantly to remove, receive and deliver the fruit to the boom-supported container.

---

This is a continuation-in-part of my copending application Ser. No. 559,578, filed June 22, 1966, entitled "Fruit Picker," now abandoned.

This invention relates to a fruit picker and has for its primary object the provision of novel apparatus for efficiently picking fruit from a tree by mechanical means and thereby substantially eliminating the need for manual labor which has been a long-existing, high cost burden to the citrus fruit industry.

In virtually all agricultural fields there have been great advancement through development of mechanical devices, but the citrus fruit industry has continued to require manual labor for picking operations. Various mechanical devices have been devised for fruit picking, but these have been inefficient and complicated and, accordingly, an important object of this invention is to provide a fruit picker which is simple in operation and construction and which may project into the branches of a tree, pick the fruit therefrom by novel lateral snapping means, and then recover the picked fruit by suitable receiving means.

Another object of the present invention is to provide a picker of the aforementioned character wherein the apparatus effects a novel combination of pulling force and lateral snapping movement to the fruit to detach the same from the branches of the tree.

A further object of my instant invention is the provision of a fruit picker wherein the power means for oscillating the fingers is contained within a tubular hub of the fingered rotor, interconnecting the hub and the shaft of the rotor, and the prime mover for rotating the shaft, as well as the connection therewith, are contained within a tubular, U-shaped support for the rotor, all to the end that interference with the operating mechanisms of the head by the branches of the tree is completely eliminated.

In the drawings:

FIG. 1 is a side elevational view of a fruit picker made pursuant to the present invention;

FIG. 2 is an enlarged, fragmentary plan view of the picking assembly, parts being broken away to reveal details of construction;

FIG. 3 is a substantially central, vertical, cross-sectional view thereof;

FIG. 4 is a fragmentary, enlarged, cross-sectional view taken along line 4—4 of FIG. 2;

FIG. 5 is a bottom plan view of the pitman drive unit for the picker, parts being broken away and in section for clearness;

FIG. 6 is a plan view of an alternate form of the picking assembly, parts being broken away and in section;

FIG. 7 is a cross-sectional view taken along line 7—7 of FIG. 6;

FIG. 8 is a side elevational view of still another embodiment of a fruit picker head made pursuant to my present invention;

FIG. 9 is a top plan view of the modified head of FIG. 8, parts being broken away and in section to reveal details of construction;

FIG. 10 is a transverse cross-sectional view taken on line 10—10 of FIG. 9 looking in the direction of the arrows; and FIG. 11 is a cross-sectional view taken on irregular line 11—11 of FIG. 8.

In the fruit picker of FIGS. 1–5, thereis provided a tractor 10 which carries an assembly 12 for removing fruit from a tree. Assembly 12 comprises a support 14 for a receptacle 16 adapted to receive fruit picked by a bank 17 of elongated fingers 18 which are reciprocated by oscillating mechanism 20.

Support 14 includes lifting means in the form of a telescopic boom 22, the outermost end of which has a vertical sleeve 24. A transversely V-shaped frame 26, having a pair of spaced barrels 28 at the apex thereof, is pivotally secured to boom 22 by a pin 30 extending through barrels 28 and sleeve 24. The diverging sides of frame 26 are interconnected by a cross-piece 32 which terminates in a tube 34.

Receptacle 16 is supported by a pair of spaced, horizontal rods 36 secured beneath the receptacle bottom 44 and extending rearwardly to terminate in respective barrels 38 which are aligned with and pivotally secured to tube 43 by a pin 40. As a pair of vertical rods 42 extent upwardly from respective rods 36 and are secured to the back 46 of receptacle 16. A pair of opposed sides 48 complete the generally rectangular configuration of receptacle 16, and a foam lining 50 covers the interior of the receptacle.

A fluid piston and cylinder unit 52 is pivotally mounted at one end to boom 22, the other end being pivotally secured to a bell crank 54 rigidly mounted on upper barrel 28 of frame 26. Reciprocation of unit 52 causes corresponding swinging of receptacle 16 and bank 17 about the axis of pin 30. A second fluid piston and cylinder unit 56 interconnects rods 36 and crosspiece 32 of frame 26, whereby reciprocation of the unit causes corresponding tilting of receptacle 16 and bank 17 about the axis of pin 40.

3 Fingers 18 extend forwardly from receptacle 16 and are horizontally spaced in parallel relationship to each other. Fingers 18 are preferably formed of semipliable material and are generally arcuate in configuration with the forward ends being raised, A pair of spaced, square bars 58 extend transversely of fingers 18 at the rear ends of the latter, and each bar 58 terminates in opposed stub shafts 60 which are carried by corresponding bearing blocks 62 mounted on respective sides 48 of receptacle 16. Referring to FIG. 4, fingers 18 extend through bars 58 and are retained in position by setscrews 64. An outer finger block 66 is secured at each end of bars 58 to progressively vertically space the outer pair of fingers at each end above the central fingers to thereby form a cradle-like structure. A cover 67 is positioned over bars 54 to provide a smooth path of travel between fingers 18 and receptacle 16.

Oscillating mechanism 20 includes a motor 68 which is supported by a bracket 70 on receptacle 16 and drives a rotary wheel 72 having apertures 74 spaced at varying distances from it axis of rotation. A pitman 76 is pivotally secured at one end to one of the apertures 74 of wheel 72, the other end of pitman 76 being secured to a cross member 78 interconnecting the proximal ends of bars 58. As is clear from FIGS. 4 and 5, pitman 76 extends through an opening 80 provided in receptacle 16 and bearing block 62.

In use, a driver stationed at the control unit 82 of tractor 10 maneuvers the latter adjacent a friut tree and suitably raises and extends boom 22 to position the forward portions of fingers 18 within the branches of the tree. Since fingers 18 are semipliable, they are merely deflected upon striking the branches of the tree and continue inwardly to substantially maintain the cradle-like structure of bank 17.

Motor 68 is actuated to rotate drive wheel 72 and thereby reciprocate pitman 76 which, in turn, reciprocates bars 58 as the stub shafts 60 slide in bearing blocks 62. A third fluid piston and cylinder unit 84 is then actuated to raise boom 22 to thereby shift bank 17 upwardly through the branches of the tree so that fingers 18 engage the fruit on the tree.

Fingers 18 are preferably arranged so that the distance between adjacent fingers is less than the effective diameter of the fruit being picked, whereby fruit above adjacent fingers 18 is engaged thereby and carried therebetween as the fingers are oscillated and raised. The oscillating action of fingers 18 imparts a lateral snapping movement to the fruit, while the raising of fingers 18 effects a vertical pulling force on the fruit, and these movements cooperate to detach the fruit at the stem thereof from the branches of the tree.

Fruit removed from the tree gravitates along the arcuate fingers 18 over cover 67 and into receptacle 16 against the foam lining 50 which cushions the impact of the rolling fruit. The cradle-like structure of fingers 18 prevents picked fruit from vibrating off the side edges of bank 17 and thus, the fruit is efficiently gathered into receptacle 16. Receptacle 16 is then retracted and either lowered to the ground or positioned over a truck for dumping the fruit which is effected by operating unit 56 to tilt receptacle 16 downwardly about pivot pin 40.

The fruit picker of the present invention is particularly suitable for removing citrus fruits since these fruits generally grow near the outer portions of the tree and thus may be easily engaged by fingers 18. Furthermore, citrus fruits are easily detached by lateral snapping movements such as that imparted by the oscillating fingers 18 which has heretofore been efficiently accomplished by manual operation.

Bank 17 may be disposed in a substantially horizontal position as illustrated, or be inclined upwardly to pick the fruit and deliver it to receptacle 16. If inclined, the pulling action for detachment could be outwardly of the tree with the fingers being repeatedly shifted in and out of the tree at various heights. The pulling force, in whatever direction it is applied, is maintained relatively small so that the fruit is not torn from the tree, but instead, is snapped at the stem by the oscillating and vibrating action of the fingers. The snapping action may be varied by changing the speed of oscillation through adjustment of motor 68, or by varying the stroke of pitman 76 which is accomplished by connecting the pitman to a different aperture 74. Bank 17 may be maneuvered into many positions for picking and dumping by suitable actuation of the piston and cylinder units 52, 56, and 84 and extension of boom 22.

In the embodiment of the invention shown in FIGS. 6 and 7, the receptacle 116 is supported by a pair of rods 136 in the same manner as receptacle 16 in the above described embodiment. Receptacle 116 is substantially rectangular and has a bottom 144, an arcuate back 146, and sides 148. A foam lining 150 covers the interior surface of recpetacle 116, and spaced outlets 151 in the receptacle lead to corresponding tubes 153 which deliver picked fruit to a suitable container below. A generally dome-shaped deflector 155 is disposed between outlets 151.

Three finger banks 117a, 117b and 117c are circumferentially spaced about continuous conveyor means in the form of a drum 158 which has splined shaft element 160 extending axially from its opposed ends. Splined sleeve elements 161 and 163 are rotatably carried by bearing blocks 162 mounted on the uppermost ends of respective vertical braces 148, the latter being supported by corresponding rods 136 along the opposed sides of receptacle 116. Sleeves 161 and 163 telescopically and complementally receive corrresponding shafts 160, and sleeve 161 is coupled for rotation to a motor 168 through a belt and pulley unit 172. Banks 117a–117c are each comprised of a plurality of radially extending, spaced fingers 118 which are curved in the direction of rotation of drum 158 and are arranged in horizontally spaced relationship in the same manner as fingers 18 so that picked fruit will be carried by adjacent fingers.

A plate 178 is rigidly secured to sleeve 161 within receptacle 116 and is connected to the proximal end of drum 158 by a fluid piston and cylinder unit 176 which may be of either hydraulic or pneumatic type. The pressure lines for operating unit 176 extend through drum 158 and the opposed shaft 160 and thence to a suitable valve mechanism which may be operated to continuously reciprocate rod 179 of unit 176 and thereby oscillate drum 158.

In operating this form of the invention, receptacle 116 is maneuvered into a position adjacent a fruit tree and motor 168 operated to rotate sleeve 161 and thereby rotates drum 158 through the spline connection in the direction of the arrow shown in FIG. 7. Unit 176 is actuated to reciprocate drum 158 along the sleeve and shaft splined connection whereby fingers 118 of each bank oscillate in respective planes.

Banks 117a–117c will be sequentially rotated into the branches of the tree during the underpassing arc of drum 158 and then out of the tree during the overpassing arc of drum 158. As fingers 118 rotate within the tree, adjacent fingers will engage the fruit and impart lateral snapping movement thereto, while additionally exerting a pulling force along the arcuate path of travel of fingers 18. These two actions cooperate to pick the fruit from the tree, after which the fruit is carried over the top of drum 158 and dropped into receptacle 116, whereupon the fruit strikes deflector 115 and rolls through the proximal outlet 151 for deposit through tube 153.

Banks 117a–117c may be repeatedly drawn in and out of the tree and vertically shifted, or may be moved continuously upwardly to pick the fruit at various heights in the tree. The respective outward or upward pulling forces cooperate with the rotating and oscillating actions of the fingers to aid in detachment of the fruit from the tree. However, the primary picking action is the oscillating lateral snapping movement so that tearing of the fruit is prevented. The speed of rotation of drum 158 may be varied by changing the speed of motor 168 or the gear ratio of belt and pulley unit 172. The length and speed of the oscillating stroke of drum 158 may be varied by suitable adjustments of the valve mechanism connected to piston and cylinder unit 176. It will be recognized that various numbers of banks 117 may be mounted on drum 158 as required by the size, weight and quantity of fruit being picked.

In the embodiment of FIGS. 8–11 an assembly 212 for removing fruit from a tree includes a rotor 213 provided with a tubular hub or drum 258. A number of banks 217 of fingers 218 secured to the hub 258 extend outwardly therefrom. Each bank 217 includes an aligned row of spaced fingers 218 radial to the axis of rotation of hub 258.

An elongated shaft 260 extending through the hub 258 is rotatably carried by a support broadly designated by the numeral 261. A prime mover 268, desirably in the nature of a hydraulic motor, is mounted on the support 261 and operably coupled with the shaft 260 to rotate it constantly in the direction of arrow 269 shown in FIG. 8.

Structure broadly designated by the numeral 270 is provided for attaching the hub 258 to the shaft 260 for rotation of the rotor 213 by shaft 260 and for continuous reciprocation or oscillation of the rotor 213 longitudinally of the shaft 260. Power means 276, desirably in the nature of a fluid piston and cylinder assembly such as hydraulic oil, interconnects the shaft 260 and the hub 258 for reciprocating the rotor 213 as the latter rotates.

As is clear in FIG. 9, the power means 276 is entirely housed within the hub 258 for connection with the shaft 260 and with the hub 258 inside the latter. Inasmuch as the power means 276 is in the nature of a fluid piston and cylinder assembly, as aforementioned, shaft 260 has a passage therethrough designated by the numeral 278 coupled with cylinder 280 of power means 276 by lines 282 and 284 for flow of fluid to and from the cylinder 280, passage 278 having a pair of branches extending inwardly from each of its ends. Conduits 286 exteriorly of the support 261 connect with opposite ends of the shaft 260 and communicate with the corresponding branches of passage 278.

Structure 270 includes a pair of relatively telescoped sleeves 288 and 290 at one end of the hub 258 and a second pair of sleeves similarly telescoped at the opposite end of hub 258 and designated by the numerals 292 and 294. All four sleeves as well as shaft 260 are transversely polygonal as seen in FIG. 10 except only that shaft 260 is of course round within bearings 296 carried by the support 261. The sleeves 290 and 294 are rigid to the bulkheads 298, secured to hub 258 therewithin whereas the inner sleeves 288 and 292 are rigid to the shaft 260, pass through the bulkheads 296, and extend inwardly and outwardly beyond the proximal ends of the corresponding sleeves 290 and 294. It is to be preferred that the sleeves 288 and 292 be formed from plastic or some other material differing from metal so as to provide a good bearing surface for reciprocation of the sleeves 290 and 294 thereon without need for lubrication. The cylinder 280 is secured rigidly to the shaft 260 between the sleeves 288 and 292 by a bracket 298 whereas the piston 300 of power means 276 is secured to the proximal bulkhead 296.

The tubular U-shaped support 261 for the rotor 213 has a bight 302 which contains the prime mover 268 and a pair of spaced legs 304 and 306, shaft 260 spanning the distance between legs 304 and 306, and the hub 258 being interposed between legs 304 and 306 remote from bight 302.

The coupling between the prime mover 268 and the shaft 260 is housed within the leg 304 of support 261 and includes a pair of chain and sprocket wheel units 308 and 310, the sprocket wheel on intermediate idler shaft 312 serving as speed reduction means.

A fruit receiving basket 316 (shown only in FIG. 8) is carried by the legs 304 and 306 of support 261 therebetween for movement of the fingers 218 into and out of the basket 316 during rotation of rotor 213. Basket 316 may be made from foraminous material as illustrated and is completely closed except at the front thereof to clear the fingers 218. It has a grid-like bottom 344 in the form of a tray for receiving the fruit and communicates with a tube 253 adapted to extend along boom 322 and empty into a suitable container (not shown) carried by tractor 10.

The outermost end of boom 322 has an upright shaft or pin 330 pivotally secured thereto for rotation about a nromally horizontal axis 331. A stabilizer rod 332 pivotally interconnecting the tractor 10 and the pin 330 presents, with boom 322, a four-point parallel linkage setup such that as the boom 322 is caused to swing vertically by means of the unit 84, pin 330 remains substantially vertical at all times.

A suitable bracket 334 rigidly secured to the bight 302 of support 261 therebeneath, together with a rearwardly extending plate 336 pivotally receive the pin 330 for swinging movement of the assembly 212 about the vertical axis of pin 330. A slip clutch 338 in the nature of a number of friction plates secured to pin 330 and plate 336 assist in precluding free floating movement of the assembly 212 with respect to pin 330.

Bracket 334 has a hydraulic motor 340 rigidly secured thereto for imparting swinging movement to the assembly 212. Its connection with pin 330 is by means of a worm 342 and a worm gear 344, the latter being rigid to the pin 330.

The operation of the assembly 212 is, in its broad aspects, comparable to that of the modification of FIGS. 6 and 7. However, the enclosure within hub 258 of all that is required to reciprocate it longitudinally of the shaft 260 and the enclosure within support 261 of all that is required to impart rotative motion to the rotor 213 obviates troublesome interference with such mechanisms by the branches of the tree into which the fingers 218 are extended during the fruit picking operation. The power means 276 is of such nature, readily available on the open market, as to effect automatic reciprocation of the piston 300 as fluid is fed thereto and received therefrom by way of conduits 286, passage 278 and lines 282 and 284.

Having thus described the invention, what is claimed as new and desired to be secured by Letters Patent is:

1. In a fruit picker, an assembly for removing fruit from a tree comprising:
   a rotor having a tubular hub;
   a plurality of fingers secured to the hub and extending outwardly therefrom;
   an elongated shaft extending through said hub;
   a support rotatably carrying the shaft;
   a prime mover mounted on the support and operably coupled with said shaft for rotating the latter;
   structure attaching the hub to the shaft for rotation thereby and reciprocation longitudinally thereof; and
   power means interconnecting the shaft and the hub for reciprocating the latter during rotation thereof,
   said power means being housed within the hub and having connection with the shaft and with the hub inside the latter,
   said power means comprising a fluid piston and cylinder assembly,
   said shaft having passage means coupled with the cylinder for flow of fluid to and from the latter.

2. The invention of claim 1,
   said structure including at least one pair of relatively telescoped sleeves secured to the shaft and to the hub respectively and slidable relatively along said axis.

3. The invention of claim 2,
   said sleeves and said shaft being transversely polygonal.

4. The invention of claim 1,
   said support being U-shaped, presenting a bight and a pair of spaced legs, the shaft spanning the distance between and the hub being interposed between said legs remote from said bight.

5. The invention of claim 4,
said support being tubular,
said prime mover and its coupling with the shaft being housed within the support.

6. The invention of claim 4; and
a fruit-receiving basket carried by said legs,
said hub being disposed for movement of the fingers into and out of the basket during rotation of the hub.

References Cited

UNITED STATES PATENTS

| | | | |
|---|---|---|---|
| 3,127,725 | 4/1964 | Richardson | 56—328 |
| 3,325,984 | 6/1967 | Christie et al. | 56—330 |
| 3,389,543 | 6/1968 | Clark | 56—337 |
| 3,404,521 | 10/1968 | Thorn et al. | 56—328 |
| 3,462,930 | 8/1969 | Clark | 56—328 |

RUSSELL R. KINSEY, Primary Examiner